US006675252B1

(12) United States Patent
Thomas

(10) Patent No.: US 6,675,252 B1
(45) Date of Patent: Jan. 6, 2004

(54) ACCELERATED GRAPHICS PORT (AGP) CONTROLLER SUPPORTING FAST WRITE TRANSACTIONS

(75) Inventor: Reji Thomas, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 500 days.

(21) Appl. No.: 09/778,653

(22) Filed: Feb. 7, 2001

(51) Int. Cl.[7] .............................................. G06F 13/00
(52) U.S. Cl. ...................................................... 710/313
(58) Field of Search ................................ 710/305, 306, 710/310, 309, 313, 315, 311

(56) References Cited

U.S. PATENT DOCUMENTS

| | | | | |
|---|---|---|---|---|
| 5,892,964 A | * | 4/1999 | Horan et al. .................. | 710/72 |
| 5,937,173 A | * | 8/1999 | Olarig et al. ................ | 710/312 |
| 6,006,291 A | * | 12/1999 | Rasmussen et al. .......... | 710/38 |
| 6,057,863 A | * | 5/2000 | Olarig ........................ | 710/312 |
| 6,106,566 A | * | 8/2000 | Klein ......................... | 710/315 |
| 6,167,468 A | * | 12/2000 | Rasmussen et al. .......... | 710/60 |

OTHER PUBLICATIONS

*Accelerated Graphics Port Interface Specification*, Chapters 1–3 and 6, Revision 2.0, Intel Corporation, (May 4, 1998), pp. 1–153 and 243–259.

* cited by examiner

Primary Examiner—Glenn A. Auve
(74) Attorney, Agent, or Firm—Peter Zawilski

(57) ABSTRACT

A circuit arrangement and method implement the data path used during the processing of multiplied (e.g., 2× or 4×) Accelerated Graphics Port (AGP) fast write transactions within a circuit block outside of the PCI circuit block conventionally used to handle the address phases of such transactions. Rather than implementing the data path within the PCI circuit block, a control path is defined between the PCI circuit block and the other circuit block to permit the PCI circuit block to initiate the data phase of the multiplied AGP fast write transaction in the other circuit block after the address phase of the transaction has been initiated in the PCI circuit block. A circuit arrangement and method also implement a logic circuit used to generate AGP fast write transactions with support only for single block multiplied AGP fast write transactions—and without any support for multiple block multiplied AGP fast write transactions. As a result of both modifications, design reuse is improved, as is the simplicity of an AGP implementation.

32 Claims, 2 Drawing Sheets

ADDRESS PATH ⟶
DATA PATH ⇠⇢

ACCELERATED GRAPHICS PORT (AGP) CONTROLLER SUPPORTING FAST WRITE TRANSACTIONS

FIELD OF THE INVENTION

The invention is generally related to electronic bus architectures and like interconnects, and in particular, to supporting fast write transactions with an Accelerated Graphics Port (AGP) controller.

BACKGROUND OF THE INVENTION

As computers and other electronic devices are called upon to handle increasingly difficult tasks, greater and greater performance demands are placed on such devices. Of particular concern in many devices, for example, is the communications speed, or "bandwidth", between interconnected devices, as the speed in which information is transmitted between such devices can have a significant impact on the overall performance of an electronic system.

A number of different interconnection standards have been developed over the years to support the ever-increasing communication needs of computers and other electronic devices. For example, the Peripheral Component Interconnect (PCI) standard was developed to interconnect external devices with the central processing unit (CPU) of a computer. PCI interconnects, or buses, interface with a CPU via a bridge to the local bus for the CPU, and PCI-compatible devices such as audio processors, storage controllers, graphics controllers, network adaptors, etc. are coupled to the bus.

While the PCI standard represented a significant improvement over prior technologies, and despite the fact that the PCI standard has been revised to support greater bandwidth capacity, the increasing input/output requirements of modern computers have necessitated the development of additional interconnect technologies.

For example, the Accelerated Graphics Port (AGP) standard has been developed as an extension of the PCI standard to provide a dedicated high speed interconnect for transmitting graphical data between a graphics accelerator or controller (functioning as an AGP-compatible device) and a system memory, without the need for CPU intervention. Many graphical applications, in particular 3D applications, have relatively high memory bandwidth requirements, and an AGP-compatible interconnect, or bus, assists in accelerating the transfer of graphical data in such memory-intensive applications.

To support the PCI and AGP standards, a computer generally relies on the use of a chipset, also known as corelogic, to provide the interface between the CPU, system memory, AGP bus and PCI bus. For interconnection with an AGP bus, the corelogic includes an AGP controller that is required to handle both AGP-type and PCI-type transactions. An AGP master (e.g., a graphics controller) can transfer data to a system memory using either AGP or PCI transactions, while a CPU can access an AGP master using only PCI transactions, whereby the AGP master can also operate as a PCI target.

Given that an AGP bus is a dedicated, direct connection, the CPU is typically not involved in data transfers between an AGP-compatible device and system memory. As a result, in many instances PCI operations, as well as CPU accesses to the memory, can occur in parallel with AGP operations. Many graphics operations, however, still require CPU involvement, and as such, the initial interface specification for the AGP standard, Revision 1.0, permits a CPU to write data to an AGP-compatible device through a two step procedure. Essentially, a CPU is required to write data into the system memory, and then direct (via a PCI transaction) that an AGP-compatible device read the data from the system memory.

Beginning with Revision 2.0, however, the AGP Specification has supported the concept of a fast write transaction. With a fast write transaction, data is transferred directly from the CPU to an AGP-compatible device, instead of requiring the data to be written into, and subsequently read out of, system memory. Revision 2.0 of the AGP Specification supports fast write transactions at 2× and 4×speeds (i.e., two or four times the clock frequency of the AGP bus).

Normal PCI write transactions occur at 1×speed, and follow PCI coherency and ordering rules. For AGP fast write transactions, however, a combination of PCI and AGP bus protocols is used, whereby a PCI-type transaction is used to initiate the transaction, and data flow generally occurs based on an AGP-type protocol. Thus, the interface to an AGP bus (often referred to as an AGP controller) for a corelogic design typically must include both PCI and AGP transaction-handling circuitry.

Implementing AGP fast write support in an AGP controller of a corelogic design, however, can be problematic, particularly when attempting to revise a prior corelogic design. In particular, as integrated circuits have become more and more complex, the development time and costs associated with designing and testing integrated circuit designs have also increased. Whenever possible, a modular "building block" approach is used, whereby a design is constructed from previously developed and tested circuit blocks. When a design is assembled from pre-existing blocks, often the amount of custom circuitry that needs to be created is reduced, as is the amount of testing that is required to verify that a design will function properly.

Support for full AGP 2.0 fast write functionality in an AGP-compatible corelogic design (e.g., to support 2× or 4×, or "multiplied" AGP fast write transactions), however, has conventionally required a substantial amount of custom design, as prior corelogic circuit blocks have not been found to be particularly reusable. As one example, a circuit block that functions as a PCI target or master would typically require the addition of circuitry to handle 2× and 4×data flow in order to be useful in an AGP 2.0 controller implementation. Adding such functionality would be time consuming and costly, and moreover, would reduce the portability of the design for use in other applications, e.g., as a standard PCI block. Moreover, since AGP logic requires high frequency 2×/4×outer timing loop circuitry, implementing fast write functionality within a PCI circuit block would add additional data paths to the extremely timing critical high frequency data path.

As another example, the AGP 2.0 Specification supports the concept of multi-block transfers via multiplied fast write transactions. A block in this context is the amount of data capable of being transferred in four clock cycles (typically 32 bytes at 2×speed and 64 bytes at 4×speed). In a multi-block multiplied AGP fast write transfer, throttling is performed on a per block basis, which is similar to other AGP transactions, but is substantially different from PCI transactions. Implementing the support for multi-block transfers in a fully compatible AGP 2.0 corelogic design therefore requires that the PCI-handling circuitry in an AGP controller be capable of throttling a multi-block transaction. Moreover, whenever multi-block transfers are permitted, various exceptional circumstances must be handled, e.g., abort conditions, disconnect conditions, etc. This additional functionality increases the complexity of the AGP controller circuitry, and thus increases development time and costs, and reduces design portability, due to the inability to reuse prior designs.

Therefore, a significant need exists in the art for an AGP controller design that supports fast write functionality with substantially less complexity and effort than has heretofore been required.

SUMMARY OF THE INVENTION

The invention addresses these and other problems associated with the prior art by providing in one aspect a circuit arrangement and method in which the data path used during the processing of multiplied (e.g., 2x or 4x) AGP fast write transactions is implemented within a circuit block outside of the PCI circuit block conventionally used to handle the address phases of such transactions. Rather than implementing the data path within the PCI circuit block, a control path is defined between the PCI circuit block and the other circuit block to permit the PCI circuit block to initiate the data phase of the multiplied AGP fast write transaction in the other circuit block after the address phase of the transaction has been initiated in the PCI circuit block.

By partitioning the AGP fast write functionality in this manner, the design of the PCI circuit block is substantially simplified, and often enables pre-existing standardized PCI circuit block designs to be reused in an AGP application with few modifications. As a result, a PCI circuit block design constructed consistent with the invention may be substantially more portable than conventional designs. Moreover, an additional path from the PCI circuit block to the often timing critical high frequency domain circuitry used elsewhere in an AGP controller design is often avoided.

The invention addresses additional problems by providing in another aspect a circuit arrangement and method in which a logic circuit used to generate AGP fast write transactions is designed to support only single block multiplied AGP fast write transactions—that is, the logic circuit is incapable of generating multiple block multiplied AGP fast write transactions. By doing so, the mix of transactions on an AGP bus is often more even, as other transactions, such as AGP reads, AGP writes, and PCI transactions are less likely to be delayed by extended, multiple block multiplied AGP fast write transactions. Moreover, the logic circuitry that implements the AGP fast write transactions is substantially simplified, yet still capable of providing faster speed over conventional PCI write transactions. The elimination of multiple block transfers, in particular, often eliminates the need to monitor for various abort conditions, thus reducing the gate count required to implement AGP fast write functionality. Moreover, often the implementation of single block only functionality is more portable than conventional designs, as existing designs require substantially less modification than would be the case if multiple block transactions were also supported.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
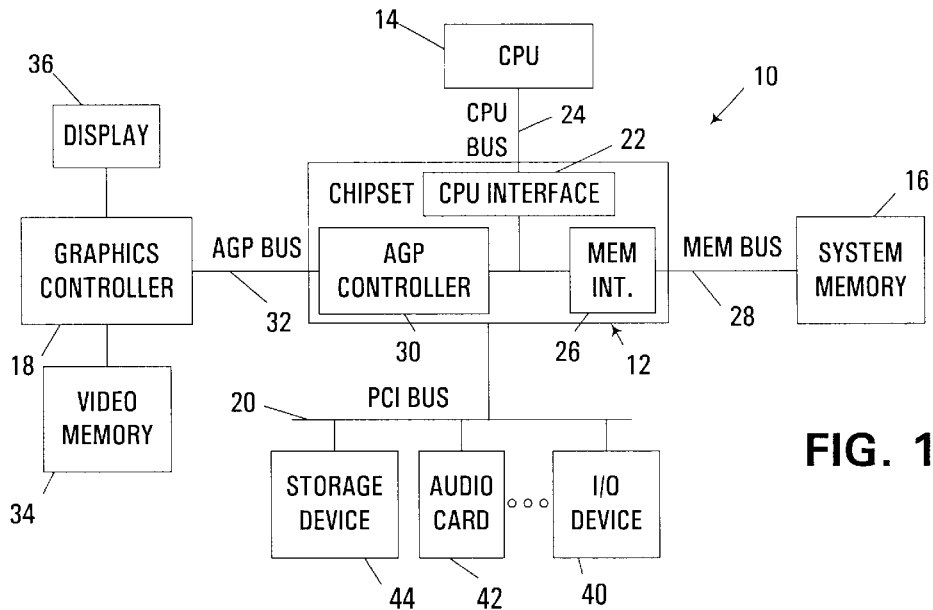
FIG. 1 is a block diagram of an apparatus including corelogic that incorporates an AGP controller with fast write functionality consistent with the invention.

Turning to the Drawings, wherein like numbers denote like parts throughout the several views, FIG. 1 illustrates an apparatus 10 including a chipset, or corelogic 12 for use in interfacing a central processing unit (CPU) 14 such as a microprocessor with a system memory, a graphics controller 18 and a PCI bus 20. Apparatus 10, for example, may be a personal computer such as a PC or Macintosh based computer, although other forms of computers, e.g., handheld computers, multi-user computers, servers, mainframes, portable computers, as well as other forms of electronic devices, may also be considered to be an apparatus consistent with the invention.

Corelogic 12, which is often referred to as a "north bridge", typically includes a CPU interface 22 providing communication with CPU 14 over a CPU bus 24, as well as a memory interface 26 providing communication with system memory 16 over a memory bus 28. An AGP controller 30 interfaces the corelogic with graphics controller 18 over an AGP bus 32. The graphics controller 18 is typically interfaced with a dedicated video memory 34, and is utilized to drive a display 36 such as a CRT, an LCD panel or other display. In addition, corelogic 12 is also configured to provide an interface to PCI bus 20 (not shown separately) so as to provide communication with a plurality of accessible I/O devices 40, e.g., an audio card 42 or a storage device 44, among other known types of PCI devices.

It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith. It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others, and transmission type media such as digital and analog communications links.

Implementation of 2×/4×AGP Fast Write Data Path in AGP Block

One improvement on conventional AGP controller designs incorporates implementing the multiplied AGP fast write data path in an AGP circuit block instead of a PCI circuit block, as would be the case were the multiplied AGP fast write data path implemented in the same circuit block as the address and non-multiplied data paths. In particular, as discussed above, implementing a multiplied AGP fast write data path in an AGP circuit block substantially reduces the customization required of a standard PCI circuit block, thus making a PCI circuit block suitable for use in a corelogic design consistent with the invention less complex, more portable, and more amenable for use in other applications, e.g., in non-AGP applications such as PCI bridge circuits, PCI interface controllers in north bridges, PCI interface controllers for embedded PCI buses, etc. Another advantage is a reduction of the number of data paths to extremely timing critical 2×/4×transmit outer timing loop circuitry.

As is well known in the art, a "circuit block" generally refers to a component of a circuit design that has been developed, tested and validated as a separate logical entity, typically for the purpose of facilitating reuse of the component in multiple designs. Design of an integrated circuit using circuit blocks generally proceeds by assembling multiple circuit blocks together to the extent possible, and then developing any "glue logic" necessary to interface the circuit blocks together into an operative design. By utilizing an assemblage of pre-existing circuit blocks, development costs and time can be substantially reduced, as a developer is often required to generate only minimal customized circuitry to interface the pre-existing blocks, rather than having to recreate the functionality of all of the blocks from scratch. A circuit designer is also often able to rely on the previous validation and testing performed on pre-existing blocks to eliminate the need to test all of the internal aspects of each and every circuit block in a design.

The partitioning of circuit functionality between circuit blocks is not arbitrary, and as such, an AGP controller design wherein the multiplied data path for use in processing multiplied AGP fast write transactions is in a separate circuit block from that which implements the address phases of such transactions is not based on an arbitrary delineation between circuit components. Rather, from a conceptual level, that which is allocated to a particular circuit block is typically clearly delineated throughout the design, testing and validation processes.

Moreover, with respect to the concept of a multiplied AGP fast write transaction, under Revision 2.0 of the AGP Specification, multiplied transactions at 2× and 4×speed are supported. However, it is envisioned that future revisions of the AGP specification may define other multiplied transactions suitable for being handled in a manner consistent with the invention. Therefore, the invention is not limited solely to applications based on Revision 2.0 of the AGP Specification.

Figure 2:
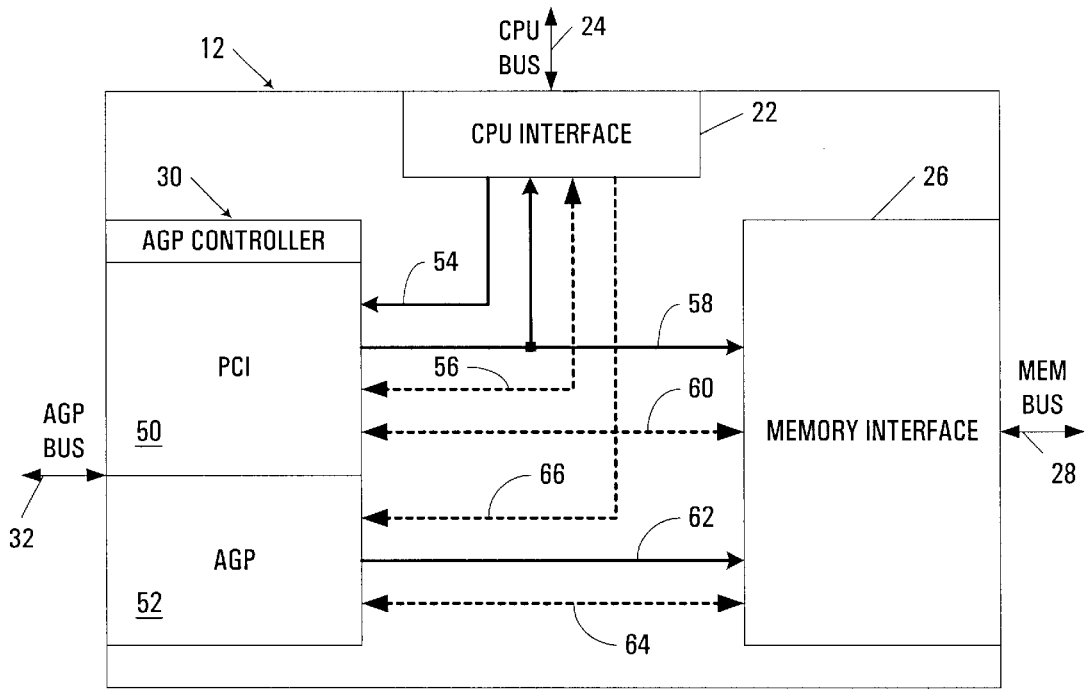
FIG. 2 is a block diagram illustrating the primary AGP pathways in the corelogic of FIG. 1.

FIG. 2 illustrates the principal address and data paths related to AGP transactions between CPU interface 22, memory interface 26 and AGP controller 30 of corelogic 12. AGP controller 30 in the illustrated implementation is comprised of a PCI circuit block 50 and an AGP circuit block 52, which respectively handle PCI and AGP-type signal protocols related to an AGP-compatible device coupled over AGP bus 32.

Consistent with the AGP Revision 2.0 Specification, an address path 54 is routed from CPU interface 22 to PCI circuit block 50, and a data path 56 is defined between CPU interface 22 and PCI circuit block 50 to enable PCI-type transactions to be initiated by the CPU on the AGP controller. Moreover, an address path 58 is routed from PCI circuit block 50 to each of CPU interface 22 and memory interface 26, and a data path 60 extends between PCI circuit block 50 and memory interface 26, to permit PCI circuit block 50 to initiate PCI-type transactions on each of CPU interface 22 and memory interface 26. Furthermore, to handle AGP-type transactions initiated by AGP circuit block 52, an address path 62 and a data path 64 extend between AGP circuit block 52 and memory interface 26. Each of data paths 56, 60 and 64 may be implemented using a bidirectional path, or using a pair of unidirectional paths.

To support the implementation of a multiplied AGP fast write data path in a manner consistent with the invention, an additional data path 66 routed from CPU interface 22 to AGP circuit block 52 is provided in addition to the aforementioned address and data paths defined by the AGP specification. It is through this data path (which is unidirectional, but may be bidirectional in other implementations) that multiplied (e.g., 2× or 4×) AGP fast write data is written to the AGP circuit block for performing a multiplied AGP fast write transaction.

Figure 3:
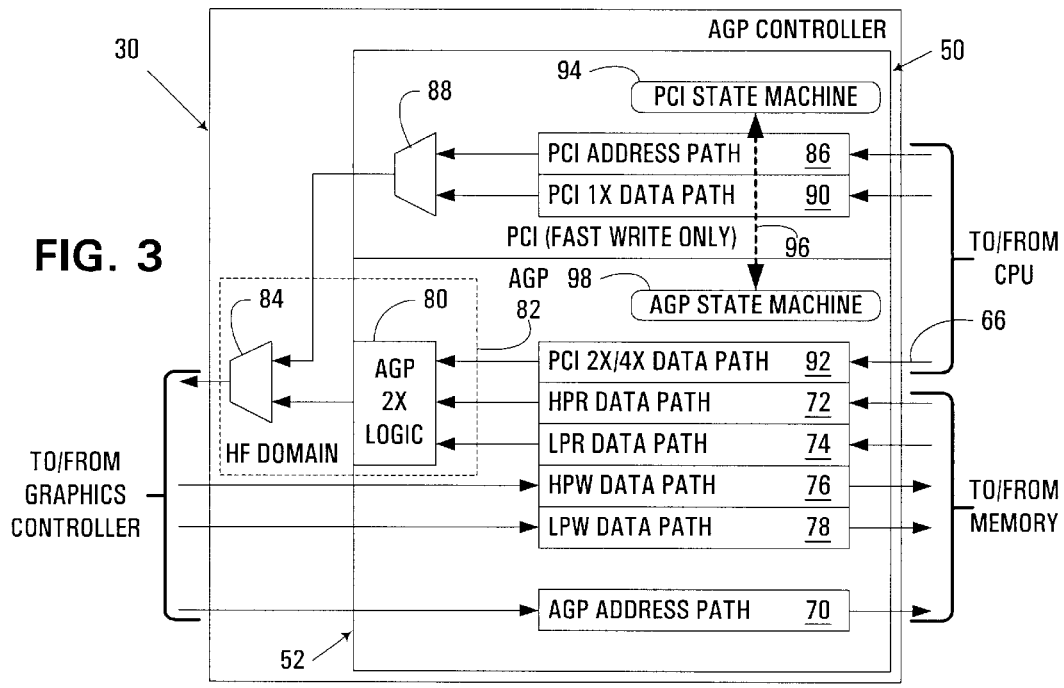
FIG. 3 is a block diagram of the AGP controller of FIGS. 1 and 2.

FIG. 3 next illustrates AGP controller 30 in greater detail, in particular illustrating the address and data paths or pathways defined within each of circuit blocks 50 and 52, as well as the state machines utilized in managing transactions processed by each circuit block.

In particular, as shown in FIG. 3, AGP transactions are processed via an AGP address path 70 and a plurality of AGP data paths 72–78, through which address and data information between the graphics controller (via the AGP bus) and the system memory are passed. Consistent with Revision 2.0 of the AGP Specification, separate data paths 72, 74, 76 and 78 are defined for High Priority Read (HPR) data, Low Priority Read (LPR) data, High Priority Write (HPW) data and Low Priority Write (LPW) data.

As also defined by the AGP specification, given that read data may be processed at 2× or 4×speed, data paths 72 and 74 feed into a transmit outer timing loop (AGP 2×logic 80) defined within a high frequency domain portion 82 of the AGP controller design. The output of circuitry 80 is fed to a multiplexer 84 for connection to the AGP bus.

With regard to PCI-type transactions such as AGP fast write transactions, a PCI address path 86 is defined within PCI circuit block 50, with the output of address path 86 fed to one input of a multiplexer 88 that outputs to another input of multiplexer 84. To implement the herein-described AGP fast write data handling consistent with the invention, however, rather than passing all write data through circuit block 50, separate data paths 90, 92 are defined for non-multiplied (e.g., 1×) PCI data and multiplied (e.g., 2× or 4×) PCI data such as multiplied AGP fast write data. Moreover, these separate data paths 90, 92 are respectively implemented in circuit blocks 50 and 52. The output of data path 90 is fed to another input of multiplexer 88, while the output of data path 92 is fed to circuitry 80 in the high frequency domain 82 of the circuit design.

Since PCI write data is handled under the AGP specification in the same manner as all PCI data, it will be appreciated that the implementation of the PCI address path and 1× data path 86, 90 within circuit block 50 is essentially the same design as is required for a standard PCI circuit block. Moreover, since PCI write transactions over the AGP bus essentially follow the PCI protocol, a PCI state machine 94 implemented within circuit block 50 is also essentially the same as for a non-AGP implementation.

Typically the only modifications from a standardized PCI circuit block design that may need to be made to circuit block 50 when in an AGP implementation is the addition of a control path 96 between PCI state machine 94 and an AGP state machine 98 implemented within circuit block 52. The additional control path permits the PCI and AGP state machines to communicate during a multiplied AGP fast write transaction to coordinate the data phase of the transaction subsequent to initiation of the address phase by the PCI circuit block.

Figure 4:
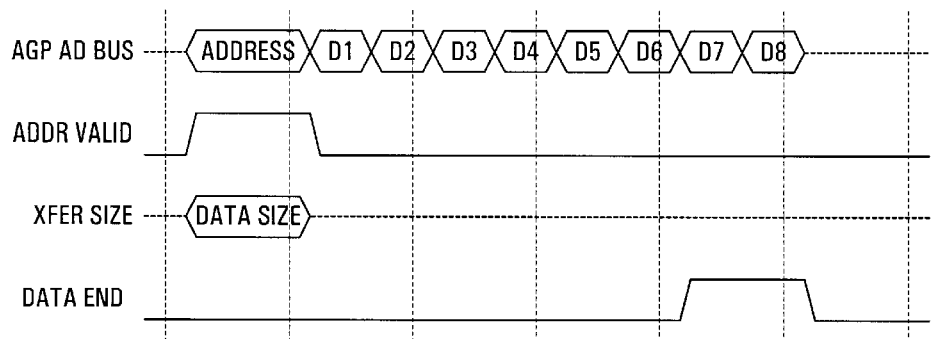
FIG. 4 is a timing diagram illustrating an exemplary assertion of control signals between the PCI and AGP blocks during a fast write transfer using the AGP controller of FIG. 3.

While other types of control signals may be fed between state machines 94, 98 to coordinate the operation of an AGP fast write transaction in AGP controller 30, FIG. 4 illustrates one exemplary set of control signals, including an Address Valid (ADDR VALID) signal, a Transfer Size (XFER SIZE) signal, and a Data End (DATA END) signal that are used to coordinate the operations between circuit blocks 50 and 52. FIG. 4, for example, shows the state of the AGP Address/Data Bus (AGP AD BUS) during performance of a 2×multiplied AGP fast write transaction, whereby in a first clock, addressing information is placed on the AGP bus by PCI circuit block 50. Concurrently with placing the address on the bus, circuit block 50 asserts the ADDR VALID signal to notify circuit block 52 that the data phase of the AGP fast write transaction may be initiated on the next clock cycle. Concurrently with asserting this signal, the amount of data being transmitted by the transaction is asserted on the XFER SIZE signal. Thus, subsequent to the first clock cycle, the AGP state machine will be ready to place multiplied fast write data on the AGP bus (represented by data D1–D8). The DATA END signal, which may not be required in some implementations, may be asserted by the AGP state machine during the last clock cycle of the data phase to notify the PCI state machine that the data phase of the transaction is complete.

It will be appreciated that the implementation of state machines 94 and 98 to coordinate the performance of a multiplied AGP fast write transaction in the manner described herein (and as shown in FIG. 4) would be well within the ability of one of ordinary skill in the art having the benefit of the instant disclosure.

Thus, a multiplied AGP fast write transaction performed with the coordination of circuit blocks 50, 52 would progress in essentially a standard manner for such fast write transactions. Specifically, the CPU would request a write when the address is available and the PCI ordering rules allow the transaction. The data would be transferred to the AGP block after the address phase. Next, the PCI state machine would forward the request to the arbiter, and once the arbiter granted the bus to the PCI (write) request, the PCI circuit block would place the address on the AGP bus for one clock. In the same clock FRAME# and IRDY# would be asserted by the AGP state machine as described in the AGP Specification. In the next clock cycle, the AGP state machine would transmit the data and coordinate the strobe signals in a manner well known in the art. It will be appreciated that FRAME# may be asserted either by the PCI or AGP circuit block during the address phase.

Thus, it may be seen that splitting the functionality for multiplied AGP fast write transactions between circuit blocks 50 and 52 maintains the PCI circuit block as a more standardized and portable design. Typically, a standard implementation of the PCI circuit block for use in non-AGP applications can be made to function with an AGP implementation supporting fast write transactions as described above with few modifications. Moreover, an additional path to the timing critical transmit outer timing loop is avoided, which reduces the complexity of the PCI block design, and avoids the necessity of the PCI block design to be 2×/4× cognizant.

Implementation of Exclusively Single Block Multiplied Fast Write Transactions

The aforementioned AGP circuit block 52 may be used to implement the complete fast write protocol supported by Revision 2.0 of the AGP specification. In the alternative, it may be desirable to support only a portion of the fast write protocol in circuit block 52 to minimize the impact on pre-existing AGP circuit designs. As is well known in the art, Revision 2.0 of the AGP specification introduces a PCI data path from the CPU to an AGP-compatible device at 2× or 4×speeds, referred to herein as a multiplied AGP fast write transaction. Doing so eliminates the prior requirement in earlier revisions of AGP specification that would require the same operation to be performed by a two step process, whereby the CPU would write to memory and the AGP would read from memory.

Under Revision 2.0 of the AGP Specification, the multiplied (e.g., 2× or 4×) fast write transaction follows a different signal protocol from traditional PCI data transfers. The signal protocol is also different from the AGP signal protocol, but the throttling is on a per block basis (i.e., four clock transfers which translates to 32 bytes in 2×mode or 64 bytes in 4×mode) which is common to AGP transfers. Throttling of an AGP fast write requires a mix of the PCI and AGP signal protocols.

To support a full fast write protocol under Revision 2.0 of the AGP Specification, an AGP-compatible device is required to accept at least one block of data before a next throttle point—i.e., before inserting a wait state. An unlimited number of blocks of data can be transmitted in a single AGP fast write transaction under Revision 2.0 of the AGP Specification.

It has been found, however, that support for throttling of multiple blocks of data is relatively complex and requires substantial revision from pre-existing (i.e., Revision 1.0 compatible) AGP circuit block designs. In particular, adding functionality for multiple block transfer requires an AGP state machine to detect a number of abort conditions, including master abort, target abort, disconnect with data and disconnect without data. Moreover, it is believed that multiple block multiplied AGP fast write transactions may pose a problem as far as allocating bandwidth between various types of AGP and PCI transactions over an AGP bus. Since the fast write protocol follows PCI rules as far as length of transaction, a single fast write transaction could tie up the AGP bus for a relatively long time, essentially stalling other types of transactions desired to be performed over the AGP bus.

Moreover, it should be noted that with a number of CPU architectures, e.g., the Power PC architecture developed by IBM and Motorola, CPU data bursts are typically limited to four clocks of 64-bit data, which can be transferred in four clocks of AGP data at a 2×data rate or two clocks of AGP data at a 4×data rate. As a consequence, it has been found that the maximum amount of data that can be transmitted by any CPU burst with many CPU designs corresponds to at most one block of data in a multiplied AGP fast write transaction.

Therefore, it may be desirable in some embodiments for AGP state machine 98 of FIG. 3 to support only single block multiplied AGP fast write transactions—that is, to support only the transfer of a single block (four clocks) of data per multiplied AGP fast write transaction.

Doing so provides a throughput of about 425 megabytes per second in 2×mode and about 852 megabytes per second in 4×mode on back-to-back fast write operations under Revision 2.0 of the AGP Specification. Moreover, doing so evens out the mix of transactions on the AGP bus between multiplied AGP fast write transactions and other types of transactions such as AGP reads, AGP writes and PCI transactions.

Another substantial benefit is the simplification of the implementation of fast write in the corelogic, while still giving well over 200% improvement over traditional PCI write transactions. Specifically, by eliminating support for multiple block transfers, no longer does an AGP state machine need to monitor a number of signals that otherwise would need to be monitored for a multiple block transfer, e.g., the DEVSEL#, TRDY# and STOP# signals used to detect various abort conditions such as target abort, master abort, disconnect with data and disconnect without data. As a result, the additional gate count on the AGP state machine may be significantly reduced, and moreover, the implementation is more portable insofar as it can be implemented easily without extensive modification of existing designs.

Figure 5:
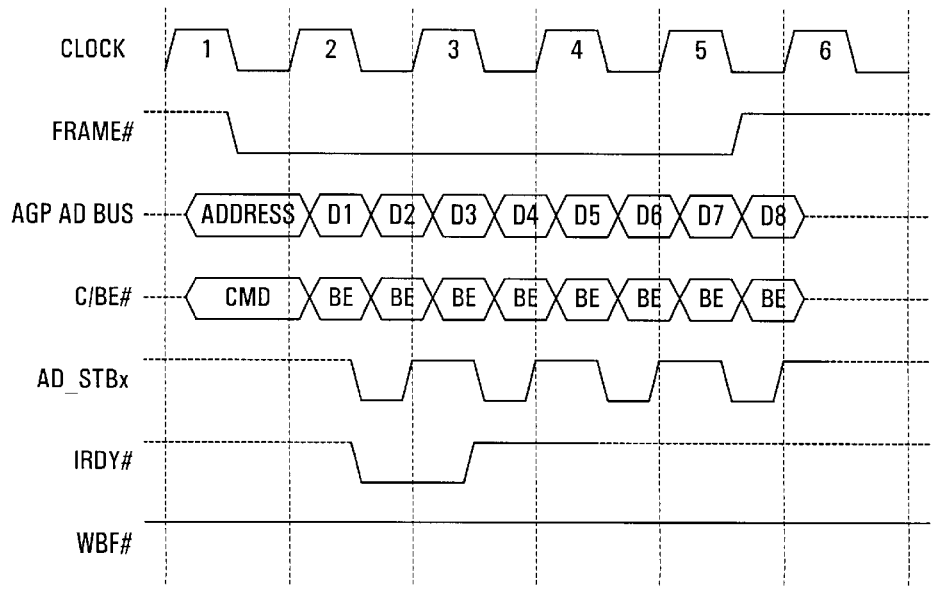
FIG. 5 is a timing diagram illustrating an exemplary single block fast write transaction using the AGP controller of FIG. 3.

FIG. 5, for example, illustrates the operation of a 2×multiplied AGP fast write transaction utilizing an AGP state machine that supports only single block multiplied fast write transfers. The state machine need only drive the IRDY# and FRAME# signals to perform data flow. The other signals shown in FIG. 5, namely the clock, AGP AD BUS, C/BE#, AD_STBx and WBF# signals, are driven in the same manner as is well known in the art.

The corelogic can initiate a fast write transfer as long as the WBF# signal is not asserted, but once the fast write transfer is initiated, the AGP-compatible device is required to accept at least one block of data before the next throttle point. By having only one block transfer, 32 bytes of data may be transmitted in four clocks in 2×mode, or 64 bytes may be transmitted in 4×mode. Thus, assuming that an exemplary PowerPC CPU at 100 MHz issues writes at a peak rate of 800 megabytes per second, the herein-described implementation can sustain this rate of peak fast write traffic while making sure the rest of the AGP data paths (e.g., AGP read and AGP write) get a fair share of the AGP bus, since a fast write transaction does not exceed five clocks with IRDY# asserted at the earliest point and six clocks with IRDY# asserted with maximum delay.

It will be appreciated that implementation of a state machine and other circuit logic to produce the timing diagram illustrated in FIG. 5 would be well within the ability of one of ordinary skill in the art having the benefit of the instant disclosure.

Various modifications may be made to the illustrated embodiments without departing from the spirit and scope of the invention. For example, as discussed above, circuit block 52 may implement the full AGP fast write protocol in some embodiments. Moreover, in other embodiments, support for only single block multiplied AGP fast write transfers may be implemented exclusive of the herein-described partitioning of data path functionality between circuit blocks 50 and 52. Moreover, in instances where other burst data characteristics are associated with a CPU, other sizes of blocks (e.g., other numbers of clock cycles) may be used in a single block AGP fast write transaction consistent with the invention.

Other modifications will be apparent to one of ordinary skill in the art. Therefore, the invention lies in the claims hereinafter appended.

What is claimed is:

1. A circuit arrangement configured to communicate with an Accelerated Graphics Port (AGP)-compatible device over an AGP bus, the circuit arrangement comprising:

(a) a first circuit block including a first logic circuit configured to handle an address phase of a multiplied AGP fast write transaction using a Peripheral Component Interconnect (PCI)-type signal protocol, the first logic circuit including an address path configured to store AGP fast write address information for transmission over the AGP bus;

(b) a second circuit block including a second logic circuit, the second logic circuit configured to handle a data phase of the multiplied AGP fast write transaction using an AGP-type signal protocol, the second logic circuit including a multiplied data path configured to store multiplied AGP fast write data information for transmission over the AGP bus; and (c) a control signal path coupled between the first and second logic circuits to permit the first logic circuit to initiate the data phase of the multiplied AGP fast write transaction in the second logic circuit after initiating the address phase in the first logic circuit.

2. The circuit arrangement of claim 1, wherein the first circuit block comprises a PCI-compatible circuit block configured for use in non-AGP logic circuits.

3. The circuit arrangement of claim 1, wherein the multiplied data path is configured to store fast write data information for 2× or 4× AGP fast write transactions, and wherein the first logic circuit further includes a non-multiplied data path configured to store PCI write data information for PCI write transactions, and wherein the first logic circuit is configured to handle both of the address and data phases of a PCI write transaction.

4. The circuit arrangement of claim 3, wherein the second circuit block further includes a transmit outer loop circuit defined in a high frequency domain portion of the second circuit block, the transmit outer loop circuit including an input coupled to the multiplied data path and an output, the circuit arrangement further comprising:

(a) a first multiplexer including an output and first and second inputs respectively coupled to the address path and the non-multiplied data path; and (b) a second multiplexer including an output coupled to the AGP bus and first and second inputs respectively coupled to the output of the first multiplexer and the output of the transmit outer loop circuit.

5. The circuit arrangement of claim 1, wherein the second circuit block comprises an AGP-compatible circuit block, and wherein the second logic circuit is further configured to handle AGP-type transactions initiated by the AGP-compatible device.

6. The circuit arrangement of claim 1, wherein the second circuit block is configured to support only single block multiplied AGP fast write transactions.

7. The circuit arrangement of claim 1, wherein the first logic circuit is configured to initiate the data phase of the multiplied AGP fast write transaction in the second logic circuit by transmitting an address valid control signal and a transfer size control signal to the second logic circuit over the control signal path.

8. An integrated circuit device comprising the circuit arrangement of claim 1.

9. The integrated circuit device of claim 8, wherein the integrated circuit device comprises corelogic for use in interfacing a central processing unit (CPU) with the AGP bus, a system memory, and a PCI bus.

10. An apparatus comprising the circuit arrangement of claim 1.

11. A program product, comprising a hardware definition program defining the circuit arrangement of claim 1, and a signal bearing medium bearing the hardware definition program, wherein the signal bearing medium includes at least one of a recordable medium and a transmission medium.

12. A circuit arrangement configured to interface a central processing unit (CPU) with a system memory over a memory bus and an Accelerated Graphics Port (AGP)-compatible device over an AGP bus, the circuit arrangement comprising:
   (a) a CPU interface configured to interface with the CPU over a CPU bus;
   (b) a memory controller coupled to the CPU interface and configured to interface with the system memory over the memory bus; and
   (c) an AGP controller coupled to the CPU interface and the memory controller, the AGP controller configured to handle AGP fast write transactions requested by the CPU interface and to initiate AGP read and write transactions with the memory controller, the AGP controller including:
      (i) a PCI circuit block including a first logic circuit configured to initiate an AGP fast write transaction requested by the CPU interface, the first logic circuit including an address path and a 1× data path, the address path configured to store PCI and AGP fast write address information and the data path configured to store PCI write data information; and
      (ii) an AGP circuit block including a second logic circuit configured to handle transactions based on an AGP-type signal protocol, the second logic circuit including a 2×/4× data path configured to store 2×/4× AGP fast write data information;
wherein the first logic circuit is further configured to handle an address phase of the AGP fast write transaction using a PCI-type signal protocol, and to initiate handling of the data phase of the AGP fast write transaction by the second logic circuit and using the 2×/4× data path.

13. A method of handling a multiplied Accelerated Graphics Port (AGP) fast write transaction, the method comprising:
   (a) handling an address phase of the multiplied AGP fast write transaction using a Peripheral Component Interconnect (PCI)-type signal protocol in a first logic circuit defined within a first circuit block, the first logic circuit including an address path configured to store AGP fast write address information for transmission over an AGP bus; and
   (b) initiating, with the first logic circuit, the handling of a data phase of the multiplied AGP fast write transaction in a second logic circuit defined within a second circuit block using an AGP-type signal protocol, the second logic circuit including a multiplied data path configured to store multiplied AGP fast write data information for transmission over the AGP bus.

14. The method of claim 13, wherein the first circuit block comprises a PCI-compatible circuit block configured for use in non-AGP logic circuits.

15. The method of claim 13, wherein the multiplied data path is configured to store fast write data information for 2× or 4× AGP fast write transactions, and wherein the first logic circuit further includes a non-multiplied data path configured to store PCI write data information for PCI write transactions, the method further comprising handling both of the address and data phases of a PCI write transaction within the first logic circuit.

16. The method of claim 13, wherein the second circuit block comprises an AGP-compatible circuit block, the method further comprising handling AGP-type transactions initiated by an AGP-compatible device using the second circuit block.

17. The method of claim 13, wherein the second circuit block is configured to support only single block multiplied AGP fast write transactions.

18. The method of claim 13, wherein initiating the handling of the data phase includes transmitting an address valid control signal and a transfer size control signal to the second logic circuit over a control signal path that couples together the first and second logic circuits.

19. An Accelerated Graphics Port (AGP) controller circuit arrangement configured to communicate with an AGP-Compatible device over an AGP bus, the circuit arrangement comprising:
   (a) at least one pathway configured to receive address and data information for use in performing a multiplied AGP fast write transaction over the AGP bus; and
   (b) a logic circuit coupled to the pathway and configured to generate at least one single block multiplied AGP fast write transaction using the address and data information, wherein the logic circuit is incapable of generating multiple block multiplied AGP fast write transactions.

20. The circuit arrangement of claim 19, wherein the logic circuit includes a state machine configured to handle a data phase of the multiplied AGP fast write transaction, the state machine configured to generate IRDY# and FRAME# signals on the AGP bus.

21. The circuit arrangement of claim 20, wherein the state machine is non-responsive to DEVSEL#, TRDY# and STOP# signals asserted on the AGP bus.

22. The circuit arrangement of claim 19, wherein the circuit arrangement is configured to be coupled to a central processing unit (CPU) capable of outputting burst data over a predetermined number of clock cycles, and wherein the single block is representative of an amount of data capable of being transmitted over the predetermined number of clock cycles.

23. The circuit arrangement of claim 22, wherein the predetermined number of clock cycles is four clock cycles.

24. An integrated circuit device comprising the circuit arrangement of claim 19.

25. The integrated circuit device of claim 24, wherein the integrated circuit device comprises corelogic for use in interfacing a central processing unit (CPU) with the AGP bus, a system memory, and a PCI bus.

26. An apparatus comprising the circuit arrangement of claim 19.

27. A program product, comprising a hardware definition program defining the circuit arrangement of claim 19, and a signal bearing medium bearing the hardware definition program, wherein the signal bearing medium includes at least one of a recordable medium and a transmission medium.

28. A method of handling a multiplied Accelerated Graphics Port (AGP) fast write transaction, the method comprising:
   (a) receiving address and data information for use in performing a multiplied AGP fast write transaction over an AGP bus; and
   (b) generating with a logic circuit at least one single block multiplied AGP fast write transaction using the address and data information, wherein the logic circuit is incapable of generating multiple block multiplied AGP fast write transactions.

29. The method of claim 28, wherein generating the single block multiplied AGP fast write transaction includes handling a data phase of the AGP fast write transaction by generating IRDY# and FRAME# signals on the AGP bus using a state machine.

30. The method of claim 29, wherein the state machine is non-responsive to DEVSEL#, TRDY# and STOP# signals asserted on the AGP bus.

31. The method of claim 28, further comprising outputting the data information as burst data from a central processing unit (CPU), the burst data generated over a predetermined number of clock cycles, wherein the single block is representative of an amount of data capable of being transmitted over the predetermined number of clock cycles.

32. The method of claim 31, wherein the predetermined number of clock cycles is four clock cycles.

\* \* \* \* \*